Patented Feb. 19, 1952

2,586,211

UNITED STATES PATENT OFFICE 2,586,211

RELEASE AGENT

Chester C. Currie, Midland, Mich., assignor to Dow Corning Corporation, Midland, Mich., a corporation of Michigan No Drawing. Application August 23, 1950, Serial No. 181,110

4 Claims. (Cl. 18—47)

This invention relates to a release agent for rubber.

Siloxanes have been employed for some years as mold release agents for various synthetic rubbers such as GRS and buna, and various plastics such as styrene, phenolics, etc. These siloxanes have proved excellent for use in the synthetic materials. However, to date no satisfactory siloxane-containing release agent has been developed for use with natural rubber bags which are employed in the molding of rubber articles such as tires.

Heretofore, the lubrication of natural rubber bags for use in molding has been accomplished by the use of various release agents containing mica. These materials suffer from the disadvantage of excessive dust around the plant, and of leaving a film on the inside of the tire. Furthermore, the bags deteriorate after limited use.

It is an object of this invention to provide a siloxane mold release composition which can be successfully employed with natural rubber. Another object is to improve the life of natural rubber bags used in molding operations. Another object is to provide a superior release agent and lubricant for molding rubber which decreases the number of rejects. Another object is to decrease the cost of molding operations by improving the life of the molding bags, another object is to improve the appearance of the inside of tires. Other objects and advantages will be apparent from the following description.

This invention relates to a mold release agent which is composed of from 10 to 35 per cent by weight of a liquid methyl polysiloxane, from 2 to 5 per cent by weight of an emulsifying agent, from 10 to 50 per cent by weight of a polyethylene glycol, from 5 to 30 per cent by weight of an alkali metal salt of a sulfonated fatty alcohol, from 10 to 25 per cent by weight of a powdered siliceous material, and from 15 to 23 per cent by weight water.

The material of this invention is an emulsion and may be prepared by any of the commonly known methods for preparing water and oil emulsions. The order of adding the ingredients is not critical, but a preferred method is as follows: A mixture of the siloxane, water, and emulsifying agent is passed through a colloid mill to obtain a thick phase emulsion. The emulsion is then thinned with the remaining water and the siliceous material is then added to the emulsion, followed by the polyethylene glycol and the salt of the alcohol sulfonate. The mixture is then repassed through a colloid mill until a uniform mix is obtained.

The polysiloxane employed in the invention is essentially a fluid dimethyl siloxane which may contain limited amounts of trimethyl siloxane units and monomethyl siloxane units. Preferably, the latter two units, if present, shall be in amount less than 10 mol per cent each.

The emulsifying agents employed in this invention are commercially available materials and may be of either the cationic, anionic, or nonionic types. Examples of such materials which are operative are morpholine salts of fatty acids, wherein the fatty acid contains from 12 to 18 carbon atoms, such as morpholine oleate and morpholine stearate; acetates of n-primary amines having from 12 to 18 carbon atoms in the amine chain such as n-dodecyl amine acetate, n-octadodecenyl amine acetate, and n-octadecadienyl amine acetate; monoesters of polyethylene glycols and fatty acids of 12 to 18 carbon atoms such as hexaethylene glycol monooleate; alkylated aryl polyether alcohols such as octylphonoxy polyethylene glycol; and thioalkyl ethers of polyethylene alcohols such as polyethylene glycol t-dodecyl thioether.

The polyethylene glycols are employed in this invention for the purpose of enhancing the lubricating properties of the composition. Any polyethylene glycol is suitable, such as, for example, diethylene glycol, triethylene glycol, and hexaethylene glycol.

Suitable detergents which are included within the scope of this invention are alkali metal salts of sulfonated fatty alcohols wherein the alcohol contains at least 8 carbon atoms. Examples of such detergents are sodium lauryl sulfate, potassium octyl sulfate, sodium stearyl sulfate, and sodium octadecyl sulfate.

The defined amounts of powdered siliceous material are included in the composition in order to prevent too intimate a contact between the rubber bag and the article being molded. Any finely divided siliceous material is suitable for use in this invention. For example, such materials include bentonite, diatomaceous earth, fume silica, silica aerogels, clay, and powdered quartz.

If desired, minor amounts of about .1 per cent of rust inhibitors such as sodium nitrite might be included in the composition.

In the commercial use of the mold release agent it may be diluted with as much as 50 parts of water per part of the compositions. In these dilute solutions the release and appearance of the molded articles is as good as in the more concentrated forms. Hence, it is preferred to operate with a dilute emulsion for the sake of economy.

The following specific example is illustrative only and should not be construed as limiting the scope of the invention.

10 parts by weight of a 350 cs. dimethyl polysiloxane fluid, one part by weight of octylphenoxy polyethylene glycol, 2 parts by weight of the tertiary dodecyl ether of polyethylene glycol, .1 part by weight sodium nitrite, and 7.5 parts by weight water were mixed and passed through a colloid mill until a thick emulsion was obtained. The emulsion was then thinned by adding 7.5 parts by weight more of water and stirred as 10 parts by weight bentonite, 35 parts by weight triethylene glycol, and 27 parts by weight of sodium lauryl sulfate were added. The mixture was again passed through a colloid mill to obtain a uniform emulsion.

The material was used to lubricate a natural rubber bag in the molding of an automobile tire and it was found that the bag released satisfactorily. The emulsion was then diluted with water in successive stages to give 5, 7.5, and 30 parts by weight water per part of the above composition. Satisfactory release of the bag from the tire was obtained at each dilution.

That which is claimed is:

1. A composition of matter composed of from 10 to 35 per cent by weight of a liquid methyl polysiloxane, from 2 to 5 per cent by weight of an emulsifying agent, from 10 to 50 per cent by weight of a polyethylene glycol, from 5 to 30 per cent by weight of an alkali metal salt of a sulfonated fatty alcohol, from 10 to 25 per cent by weight of a powdered siliceous material, and from 15 to 23 per cent by weight water.

2. A composition of matter composed of 1 part by weight of the composition of claim 1 and from 1 to 50 parts by weight water.

3. A composition of matter composed of 10 parts by weight dimethyl polysiloxane fluid, 1 part by weight octyl phenoxy polyethylene glycol, 2 parts by weight of the t-dodecyl ether of polyethylene glycol, 10 parts by weight bentonite, 35 parts by weight triethylene glycol, 27 parts by weight of sodium lauryl sulfate, and 15 parts by weight water.

4. A composition of matter composed of 1 part by weight of the composition of claim 3 and from 5 to 50 parts by weight water.

CHESTER C. CURRIE.

REFERENCES CITED

The following references are of record in the file of this patent:

UNITED STATES PATENTS

| Number | Name | Date |
| --- | --- | --- |
| 2,406,671 | Diamond | Aug. 27, 1946 |
| 2,451,362 | Snyder | Oct. 12, 1948 |

OTHER REFERENCES

"Oilways," July 1946, Esso Standard Oil Co., New York, page 3, col. 3.